United States Patent
Kim et al.

(10) Patent No.: US 7,735,109 B2
(45) Date of Patent: Jun. 8, 2010

(54) METHOD AND APPARATUS FOR SETTING CHANNELS AUTOMATICALLY IN WIRELESS TRANSCEIVER SYSTEM

(75) Inventors: Hye-jin Kim, Yongin-si (KR); Hong-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1078 days.

(21) Appl. No.: 11/020,113

(22) Filed: Dec. 27, 2004

(65) Prior Publication Data

US 2005/0149983 A1 Jul. 7, 2005

(30) Foreign Application Priority Data

Jan. 7, 2004 (KR) ............... 10-2004-0000885

(51) Int. Cl.
*H04N 7/16* (2006.01)
(52) U.S. Cl. ............. 725/139; 725/140; 725/141; 725/142; 725/151
(58) Field of Classification Search ......... 725/139–142, 725/151; 348/731–732
See application file for complete search history.

(56) References Cited

U.S. PATENT DOCUMENTS

| | | | |
|---|---|---|---|
| 5,226,071 A | * | 7/1993 | Bolliger et al. .......... 455/435.3 |
| 5,708,961 A | * | 1/1998 | Hylton et al. ............. 725/81 |
| 6,260,193 B1 | | 7/2001 | Chang et al. |
| 6,687,486 B2 | * | 2/2004 | Grzeczkowski ......... 455/3.05 |
| 2002/0059642 A1 | * | 5/2002 | Russ et al. ............... 725/135 |
| 2003/0097655 A1 | * | 5/2003 | Novak ...................... 725/31 |
| 2004/0068744 A1 | * | 4/2004 | Claussen et al. .......... 725/81 |
| 2004/0148634 A1 | * | 7/2004 | Arsenault et al. ......... 725/89 |

FOREIGN PATENT DOCUMENTS

| JP | 11-046294 A | 2/1999 |
|---|---|---|
| JP | 2000-165364 A | 6/2000 |

* cited by examiner

*Primary Examiner*—Christopher Kelley
*Assistant Examiner*—Charles N Hicks
(74) *Attorney, Agent, or Firm*—Sughrue Mion, PLLC (57) ABSTRACT

Provided are a method of and an apparatus for automatically setting a channel to achieve channel synchronization between a transmitter and a receiver in a wireless transceiver system. The transmitter stores information about a channel tuned according to an initial channel number, transmits a message indicating a completion of the channel information storage to a receiver, and transmits a next channel number in response to a message confirming the completion of a channel information storage performed in the receiver. The receiver receives a tuned channel number and the message indicating the completion of the channel information storage in sequence from the transmitter, stores channel information corresponding to the received tuned channel number, transmits the message confirming the completion of the channel information storage to the transmitter, and waits for the next channel number to be received from the transmitter.

14 Claims, 5 Drawing Sheets

FIG. 4

METHOD AND APPARATUS FOR SETTING CHANNELS AUTOMATICALLY IN WIRELESS TRANSCEIVER SYSTEM

BACKGROUND OF THE INVENTION

This application claims the priority of Korean Patent Application No. 10-2004-0000885, filed on Jan. 7, 2004, in the Korean Intellectual Property Office, the disclosure of which is incorporated herein in its entirety by reference.

1. Field of the Invention

Methods and apparatuses consistent with the present invention relate to a wireless transceiver system, and more particularly, to a method of and an apparatus for setting channels automatically in a wireless transceiver system.

2. Description of the Related Art

A typical transceiver system includes a transmitter and a wireless receiver. For example, assuming the transmitter is a set top box and the receiver is a television set, the set top box converts a digital image signal, which is received from an antenna, to an analog image signal. The television set displays the image signal on the screen, which is input from the set top box. The television set may be separated from the set top box by a wall. For example, if the set top box is installed in the living room, the television set may be installed in the bedroom. In principle, the user can operate various functions of the set top box and the television set remotely using their respective remote controllers.

In such a typical transceiver system, a transmitter and a receiver should maintain an identical channel. For example, when a user controls the receiver using a remote controller to execute an automatic channel mode, the transmitter operates in response to a tuned broadcasting signal, and the receiver operates in response to a broadcasting signal sent by the transmitter. Viewers can confirm channel information from the receiver and remotely manipulate the channel information displayed on the receiver using the remote controller. However, the receiver may have a channel information map different than a channel information map sent by the transmitter. In other words, since the transmitter and the receiver in a typical wireless transceiver system are separated from each other, they may not have consistent channel information and an identical channel map.

SUMMARY OF THE INVENTION

An exemplary embodiment of the present invention provides a method of and an apparatus for automatically setting a channel, by which a transmitter and a receiver maintain consistency in channel information by wirelessly exchanging messages upon automatic channel setting in a wireless transceiver.

According to an exemplary aspect of the present invention, there is provided an automatic channel setting apparatus in a wireless transceiver system, the apparatus including: a transmitter storing information about a channel tuned according to an initial channel number, transmitting a message indicating a completion of the channel information storage to a receiver, and transmitting a next channel number in response to a message confirming the completion of a channel information storage performed in the receiver; and the receiver receiving a tuned channel number and the message indicating the completion of the channel information storage in sequence from the transmitter, storing channel information corresponding to the received tuned channel number, transmitting the message confirming the completion of the channel information storage to the transmitter, and waiting for the next channel number to be received from the transmitter.

According to another exemplary aspect of the present invention, there is provided an automatic channel setting method performed between a transmitter and a receiver in a wireless transceiver system. The method includes an operation in the transmitter and an operation in the receiver. The operation in the transmitter includes storing information about a channel tuned according to an initial channel number, transmitting a message indicating a completion of the channel information storage to a receiver, and transmitting a next channel number in response to a message confirming the completion of a channel information storage performed in the receiver. The operation in the receiver includes receiving a tuned channel number and the message indicating the completion of the channel information storage in sequence from the transmitter, storing channel information corresponding to the received tuned channel number, transmitting the message confirming the completion of the channel information storage to the transmitter, and waiting for the next channel number to be received from the transmitter.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY NON-LIMITING EMBODIMENTS OF THE INVENTION

Figure 1:
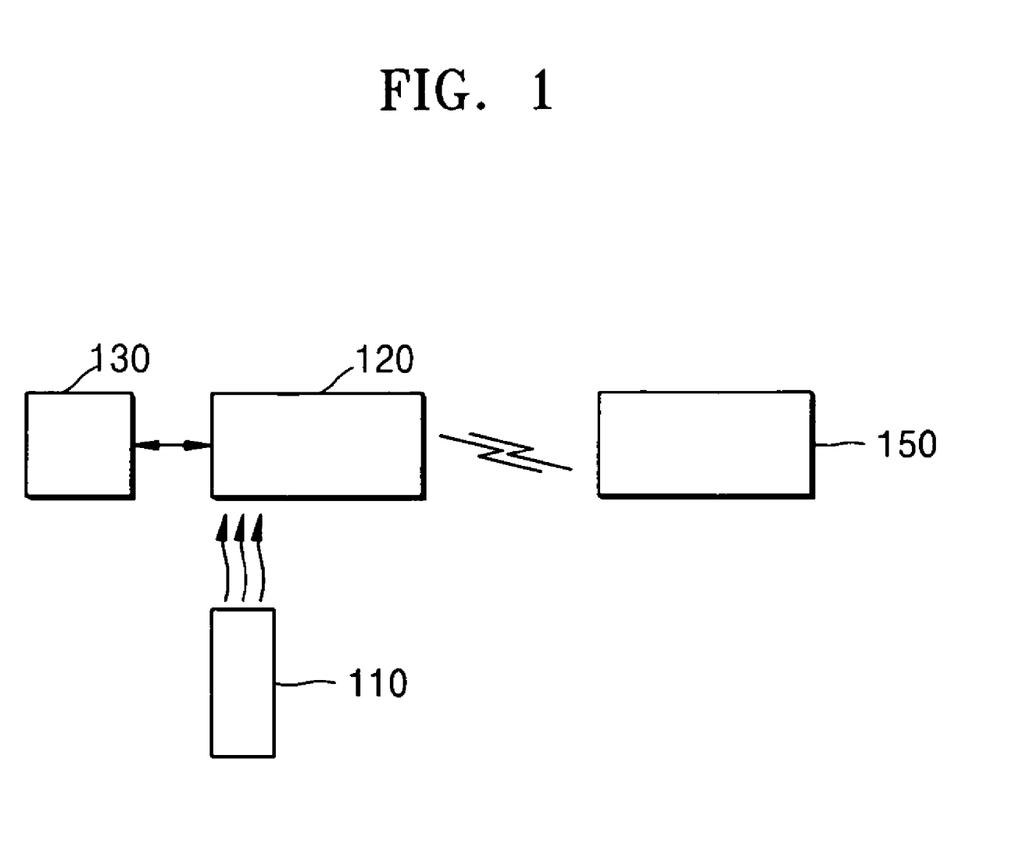
FIG. 1 is a block diagram of a wireless transceiver system according to an exemplary embodiment of the present invention.

Referring to FIG. 1, a wireless transceiver system according to an exemplary embodiment of the present invention includes a transmitter 120 and a receiver 150. A remote controller 110 applies a control command to the transmitter 120 and controls various operations. The transmitter 120 can carry out wireless communications with the receiver 150. For example, it is assumed that the transmitter 120 is installed in a living room, and the receiver 150 is installed at a distance from the transmitter 120. In addition, the transmitter 120 and the receiver 150 each include wireless transceiver modules and can transceive various signals through wireless LANs of 5 GHz and 430 MHz bands.

The transmitter 120 converts a digital broadcasting signal received from an antenna to an analogue broadcasting signal, displays a key signal in an on-screen display (OSD) format received from the remote controller 110 on a first display unit 130 which is connected to the transmitter 120 by cable, and wirelessly transmits a broadcasting signal. In addition, the transmitter 120 sets a channel map concerning information about a tuning channel and then transmits a message indicating completion of the setting of the tuning channel. In response to a channel information storage confirmation message from the receiver 150, the transmitter 120 transmits a next channel number to the receiver 150.

The receiver 150 displays the broadcasting signals on the screen in an OSD format which were wirelessly received from the transmitter 120. In addition, the receiver 150 receives a tuning channel number from the transmitter 120. In response to the channel setting completion message from the transmitter 120, the receiver 150 sets a channel map for the received channel number, transmits the channel information storage confirmation message to the transmitter 120, and waits for the next channel number.

Figure 2:
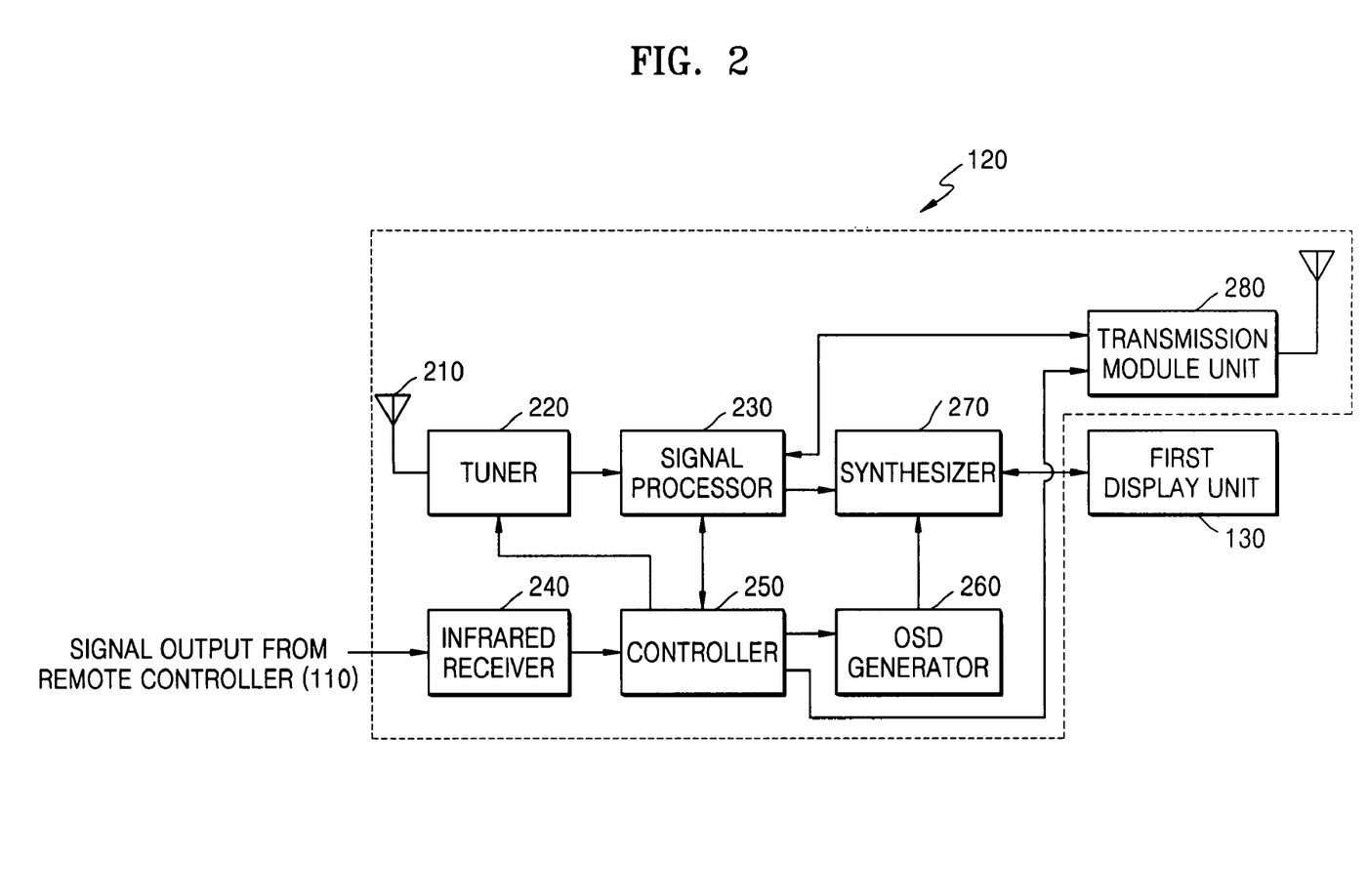
FIG. 2 is a detailed diagram of a transceiver shown in FIG. 1.

FIG. 2 is a detailed diagram of the transmitter 120 of FIG. 1. Referring to FIG. 2, the transmitter 120 includes an antenna 210, a tuner 220, a signal processor 230, an infrared receiver 240, a controller 250, an OSD generator 260, a synthesizer 270, and a transmission module unit 280. The tuner 220 selects a broadcasting signal received from the antenna 210 according to tuning data generated by the controller 250.

The signal processor 230 extracts a transport stream or an analog signal from the broadcasting signal output by the tuner 220 and either outputs the same to the transmission module unit 280 or decodes the transport stream into an RGB signal or a voice signal and outputs the RGB signal or the voice signal to the synthesizer 270. The signal processor 230 also receives the channel information storage confirmation message from the transmission module unit 280. The infrared receiver 240 amplifies an infrared signal received from the remote controller 110 of FIG. 1 to a predetermined level.

The controller 250 applies the tuning data to the tuner 220 and extracts a key code corresponding to a function control command from the infrared signal received from the infrared receiver 240. In addition, the controller 250 generates a message indicating a completion of setting of a channel tuned according to an initial channel number, outputs the same to the transmission module unit 280, and waits for a next channel number until receiving a channel storage confirmation message from the signal processor 230. The OSD generator 260 generates OSD information relevant to the key code generated by the controller 250.

The synthesizer 270 synthesizes the image signal generated by the signal processor 230 with the OSD information generated by the OSD generator 260. The first display unit 130 of FIG. 1 displays the image signal and the OSD information synthesized by the synthesizer 270.

The transmission module unit 280 converts the transport stream processed by the signal processor 230 and the channel setting completion message generated by the controller 250 into a wireless signal of a predetermined format, and transmits the wireless signal to the receiver 150 of FIG. 1 through a wireless channel. The transmission module unit 280 also demodulates a message received from the receiver 150 and outputs a result of the demodulation to the signal processor 230.

Figure 3:
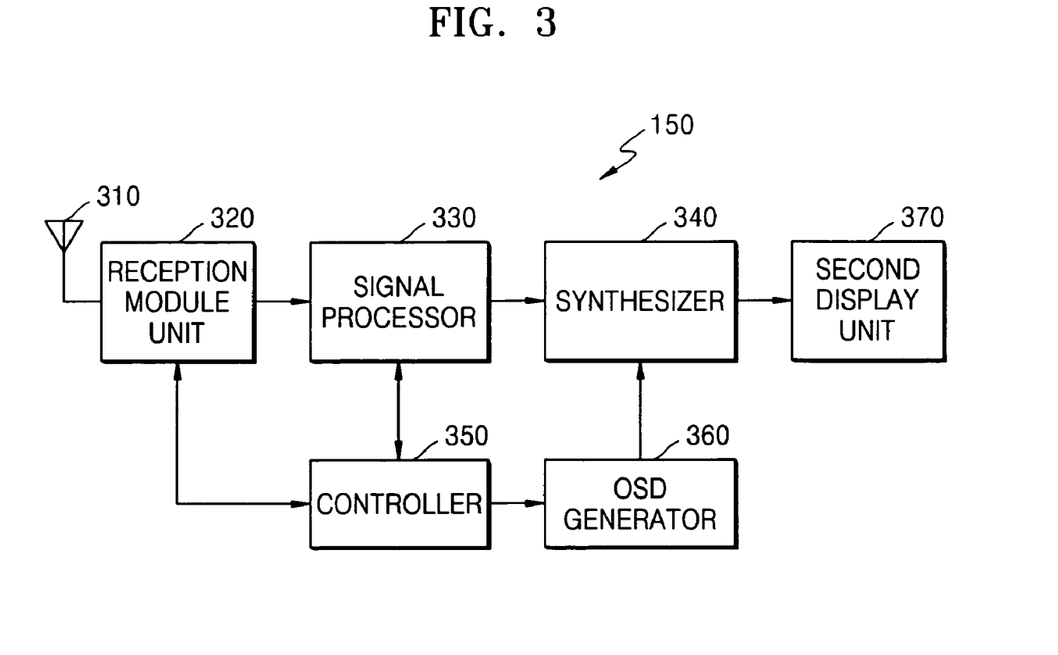
FIG. 3 is a detailed diagram of a receiver shown in FIG. 1.

FIG. 3 is a detailed diagram of the receiver 150 of FIG. 1. Referring to FIG. 3, a reception module unit 320 demodulates a key code, a transport stream (or an analog signal), and a message signal that are extracted from an RF signal received through an antenna 310. The reception module unit 320 also converts a channel information storage confirmation message from a controller 350 into a wireless signal of a predetermined format. A signal processor 330 decodes a demodulated transport stream into an RGB signal or a voice signal.

The controller 350 converts the key code received from the reception module unit 320 into a function control command, extracts a tuned channel number and a channel setting completion message from the message signal separated by the reception module unit 320, produces the channel information storage confirmation message, which relates to the channel number, and outputs the channel information storage conformation message to the reception module unit 320.

An OSD generator 360 generates OSD information corresponding to the key code generated by the controller 350. A synthesizer 340 synthesizes an image signal generated by the signal processor 330 with the OSD information generated by the OSD generator 360. A second display unit 370 displays the image signal and the OSD information synthesized by the synthesizer 340 on a cathode-ray tube (CRT; not shown).

Figure 4:
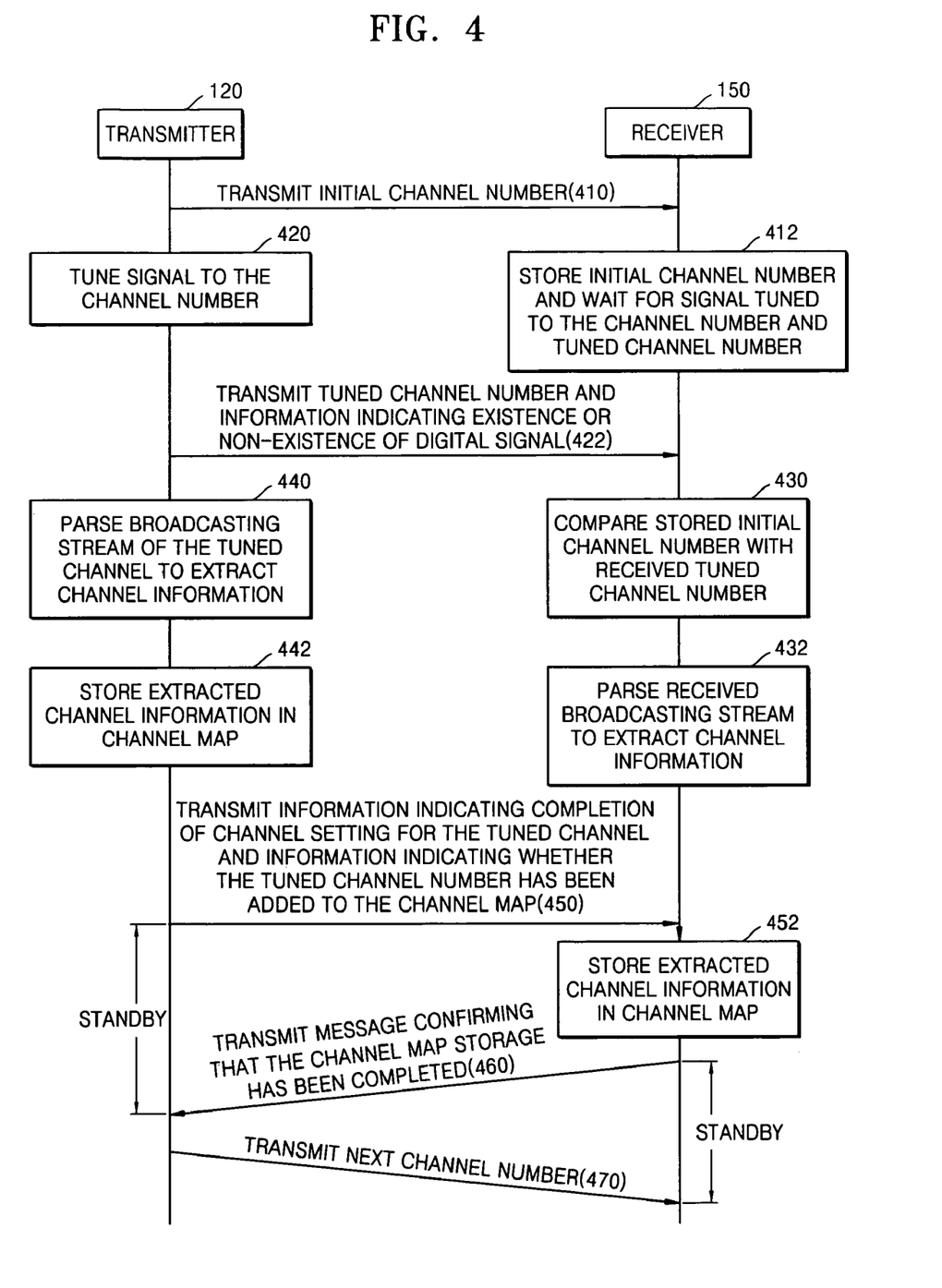
FIG. 4 is an exemplary flowchart illustrating an automatic channel setting method performed in a controller of the wireless transceiver of FIG. 1, when the advanced television systems committee (ATSC) standard is adopted.

FIG. 4 is a flowchart illustrating an automatic channel setting method performed in a controller of the wireless transceiver of FIG. 1, when the advanced television systems committee (ATSC) standard is adopted.

First, in operation 410, the transmitter 120 transmits an initial channel number to the receiver 150. For example, it is assumed that the initial channel number is 11 and a broadcasting signal is a digital signal.

Next, in operation 412, the receiver 150 stores the initial channel number and waits for a signal tuned to the channel number and the tuned channel number to be received from the transmitter 120. Information about an analogue channel and information about a digital channel are stored in different memories. That is, the digital channel and the analogue channel can be differentiated according to the channel information.

Next, in operation 420, the transmitter 120 tunes a signal to the channel number 11. Thereafter, in operation 422, the transmitter 120 transmits the tuned channel number and information indicating the existence or non-existence of a digital signal (a synchronization signal) to the receiver 150. When the digital signal is detected or when a channel is locked, the transmitter 120 transmits a broadcasting stream of the tuned channel to the receiver 150 and simultaneously starts an automatic channel setting operation. More specifically, in operation 440, the transmitter 120 parses the broadcasting stream of the tuned channel to extract channel information (for example, a channel number, a broadcasting station, etc.) using a program and system information protocol (PSIP). Next, in operation 442, the transmitter 120 stores the extracted channel information in a channel map. Next, in operation 450, the transmitter 120 transmits information indicating a completion of setting of a channel map for the tuned channel and information indicating whether the tuned channel number has been added to the channel map to the receiver 150.

Meanwhile, in operation 430, when receiving the tuned channel number from the transmitter 120, the receiver 150 compares the stored initial channel number with the received tuned channel number. When the stored initial channel number and the received tuned channel number do not match each other, the receiver 150 transmits an error message to the transmitter 120 and returns to a standby mode. In response to the error message from the receiver 150, the transmitter 120 re-transmits the initial channel number to the receiver 150. In operation 432, when the stored initial channel number and the received tuned channel number match each other, the receiver 150 parses the broadcasting stream received wirelessly from the transmitter 120 to extract channel information (for example, a channel number, a broadcasting station, etc.). Next, in operation 452, the receiver 150 stores the extracted channel information in a channel map when receiving the information indicating the completion of the channel map storage and the information indicating the addition or non-addition of the tuned channel number from the transmitter 120. The transmitter 120 does not transmit a next channel number until receiving a message confirming that the channel map storage has been completed from the receiver 150.

In operation 460, after the channel information extracted from the broadcasting stream is stored in the channel map in operation 452, the receiver 150 transmits the message confirming that the channel map storage has been completed to the transmitter 120. Next, in operation 470, the transmitter 120 transmits a next channel number for a next automatic channel programming. The receiver 150 is in standby until it receives the next channel number from the transmitter 120.

Consequently, the transmitter 120 and the receiver 150 maintain consistency of channel information and a channel map by exchanging messages relating to the channel information.

Figure 5:
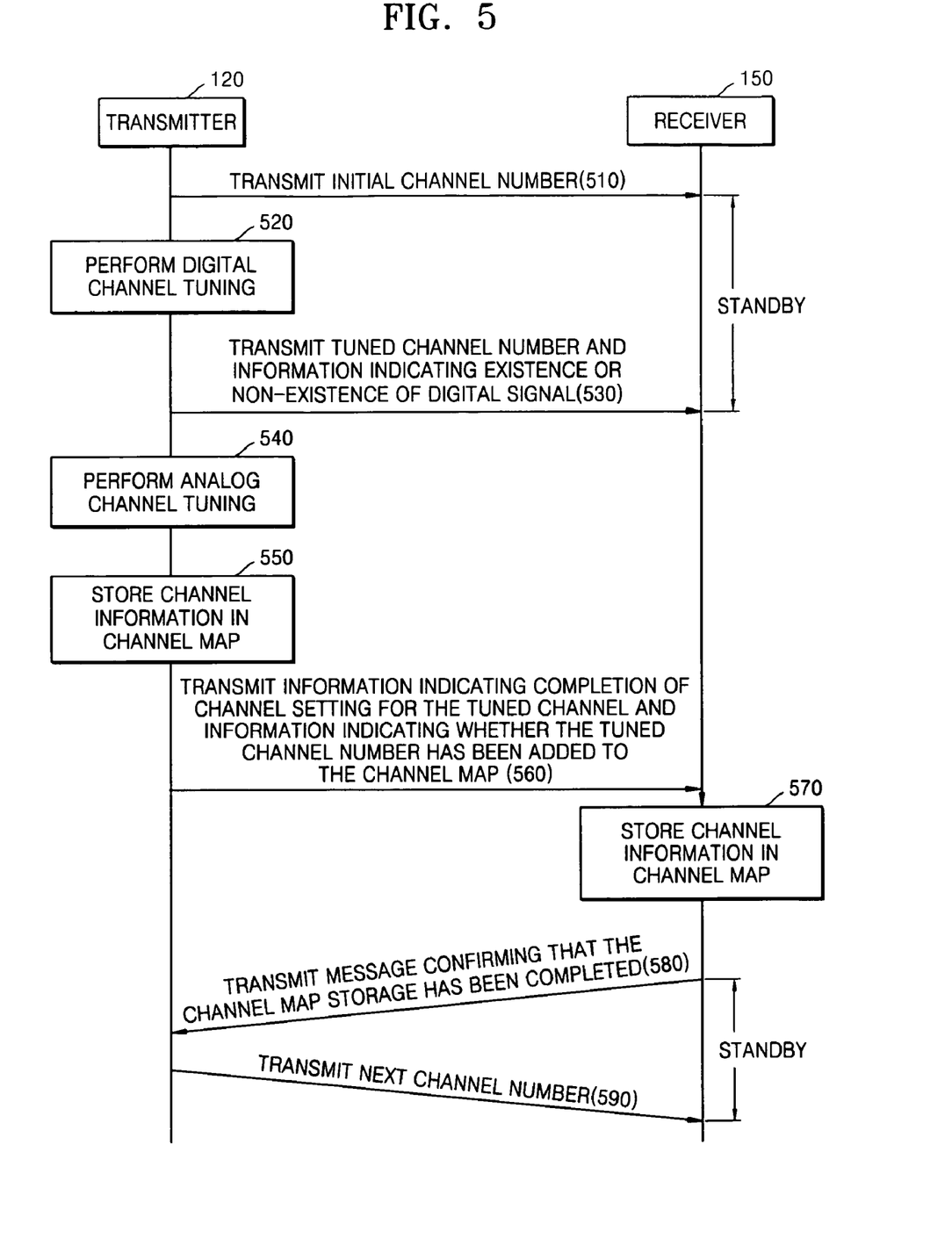
FIG. 5 is an exemplary flowchart illustrating an automatic channel setting method performed in a controller of the wireless transceiver of FIG. 1, when the national television standard committee (NTSC) standard is adopted.

FIG. 5 is a flowchart illustrating an automatic channel setting method performed in a controller of the wireless transceiver of FIG. 1, when the national television standard committee (NTSC) standard is adopted.

First of all, in operation 510, the transmitter 120 transmits an initial channel number to the receiver 150. For example, it is assumed that the initial channel number is 22 and the broadcasting signal is an analogue signal.

After receiving the initial channel number from the transmitter 120, the receiver 150 waits for information about the existence or non-existence of a digital signal and a current channel number from the transmitter 120.

Then, in operation 520, the transmitter 120 tunes the digital channel 22. In operation 530, if no digital signals are detected, the transmitter 120 transmits the channel number and information indicating non-existence of a digital signal to the receiver 150. Thereafter, in operation 540, an analog channel 22 is tuned. Next, the transmitter 120 starts an automatic channel setting operation at the moment when the information about the existence or non-existence of a digital signal is detected. In other words, in step 550, the transmitter 120 stores information about the tuned analog channel in a channel map. Next, in operation 560, when the channel map setting operation for one channel is completed, the transmitter 120 transmits information indicating the completion of the channel map setting and information about the addition or non-addition of the tuned channel in the channel map to the receiver 150.

Meanwhile, in operation 570, the receiver 150 stores the channel information received from the transmitter 120 in a channel map when receiving the information indicating the completion of the channel map setting and the information about the addition or non-addition of the tuned channel from the transmitter 120.

The operation 570 is followed by operation 580, in which the receiver 150 transmits a message confirming that the channel information storage has been completed to the transmitter 120. Next, in operation 590, the transmitter 120 transmits a next channel number to the receiver 150. The receiver 150 is on standby until it receives the next channel number from the transmitter 120.

As described above, upon automatic channel setting programming according to the present invention, a transmitter and a receiver can maintain consistency in channel information and a channel map by wirelessly transceiving messages relating to the channel information.

The present invention can be realized as a code on a recording medium readable by a computer. The recording medium, which a computer can read includes all kinds of recording devices which store data that can be read by a computer system. ROM, RAM, CD-ROMs, magnetic tapes, hard disks, floppy disks, flash memory, and optical data storing devices are examples of the recording medium. The recording medium can also be in a carrier wave form (for example, transmission through the Internet). Furthermore, the recording medium can be accessed from a computer in a computer network, and the code can be stored and executed in a remote method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An automatic channel setting apparatus in a wireless transceiver system, the apparatus comprising:

a transmitter which stores channel information about a channel tuned according to an initial channel number, transmits a message indicating a completion of the channel information storage to a receiver; and the receiver receives the initial channel number, a tuned channel number and the message indicating the completion of the channel information storage from the transmitter, stores channel information corresponding to the received tuned channel number, transmits a message confirming the completion of the channel information storage to the transmitter, and waits for a next channel number to be received from the transmitter, wherein the receiver compares the received tuned channel number and the received initial channel number, wherein if the received tuned channel number and the received initial channel number do not match, the receiver sends an error message to the transmitter and returns to a standby mode, wherein the transmitter re-transmits the initial channel number in response to the error message, and wherein the transmitter transmits, to the receiver, the next channel number in response to the message confirming the completion of the channel information storage.

2. The automatic channel setting apparatus of claim 1, wherein the transmitter comprises:

a tuner which selects a broadcasting signal according to tuning data;

a signal processor which extracts at least one of a video and audio signal from the broadcasting signal selected by the tuner and a channel information storage confirmation message from a received message;

a controller which applies the tuning data to the tuner, stores channel information of the selected broadcasting signal, generates a message indicating the completion of the channel information storage, and generates a next channel number in response to the channel information storage confirmation message received from the signal processor; and a transmission module unit which converts the at least one of the video and audio signal extracted by the signal processor and the message generated by the controller into a wireless signal of a predetermined format, transmits the wireless signal to the receiver through a wireless channel, and receives the channel information storage confirmation message from the receiver.

3. The automatic channel setting apparatus of claim 2, wherein the controller generates an initial channel number, transmits a channel number tuned by the tuner and information about the existence or non-existence of a digital signal to the receiver, parses a stream of the tuned channel to extract channel information, stores extracted channel information in a channel map of the transmitter, transmits a message indicating a completion of the channel information storage and information about addition or non-addition of the tuned channel number to the channel map to the receiver, and transmits the next channel number to the receiver in response to the channel information storage confirmation message received from the receiver.

4. The automatic channel setting apparatus of claim 2, wherein when no digital signals are detected through digital channel tuning, the controller transmits a channel number tuned by the tuner and information indicating the non-existence of a digital signal to the receiver, tunes an analog channel, stores channel information about the tuned analog channel in a channel map, transmits a signal indicating a completion of the channel information storage and information about addition or non-addition of the tuned channel number to the channel map to the receiver, and transmits the next channel number to the receiver in response to the channel information storage confirmation message received from the receiver.

5. The automatic channel setting apparatus of claim 1, wherein the receiver comprises:
  a reception module unit which demodulates at least one of a video and audio signal and a message from a wireless signal received through a wireless channel and transmits the message confirming the completion of the channel information storage as a wireless signal with a predetermined format; and
  a controller which extracts the channel number and a channel setting completion message from the message received by the reception module unit, stores channel information corresponding to the extracted channel number in a channel map of the receiver, and outputs the channel information storage confirmation message to the receiver module unit.

6. The automatic channel setting apparatus of claim 5, wherein the transmitter includes a channel map and transmits a message having information indicating an addition or non-addition of the tuned channel number to the channel map of the transmitter, to the receiver, and
  wherein the controller receives the tuned channel number, compares the received tuned channel number with a stored channel number, extracts channel information from a received broadcasting stream when the received tuned channel number and the stored channel number match each other, stores the extracted channel information in the channel map of the receiver when receiving the message indicating the completion of the channel information storage and the information indicating the addition or non-addition of the channel information to the channel map of the transmitter from the transmitter, transmits the message confirming the completion of the channel information storage to the transmitter, and then waits for the next channel number.

7. The automatic channel setting apparatus of claim 5, wherein the controller stores the channel information in the channel map of the receiver when receiving the channel number tuned to an analog channel and the signal indicating the completion of the channel information storage from the transmitter, transmits the message confirming the completion of the channel information storage to the transmitter, and waits for the next channel number.

8. An automatic channel setting method performed between a transmitter and a receiver in a wireless transceiver system, the method comprising:
  transmitter operations including storing information about a channel tuned according to an initial channel number, transmitting a message indicating a completion of the channel information storage to a receiver; and
  receiver operations including receiving the initial channel number, a tuned channel number and the message indicating the completion of the channel information storage from the transmitter, storing channel information corresponding to the received tuned channel number, transmitting a message confirming the completion of the channel information storage to the transmitter, and waiting for a next channel number to be received from the transmitter,
  wherein the receiver operations include comparing the received tuned channel number and the received initial channel number,
  wherein if the received tuned channel number and the received initial channel number do not match, the receiver operations include sending an error message to the transmitter and returning to a standby mode,
  wherein the transmitter operations include re-transmitting the initial channel number in response to the error message, and
  wherein the transmitter operations include transmitting, to the receiver, the next channel number in response to the message confirming the completion of the channel information storage performed in the receiver.

9. The automatic channel setting method of claim 8, wherein the transmitter operations further comprise:
  generating an initial channel number;
  transmitting a tuned channel number and information about the existence or non-existence of a digital signal to the receiver;
  parsing a stream of the tuned channel to extract channel information;
  storing extracted channel information in a channel map;
  transmitting the message indicating a completion of the channel information storage and information about addition or non-addition of the tuned channel number to the channel map to the receiver; and
  transmitting the next channel number to the receiver when receiving the channel information storage confirmation message from the receiver.

10. The automatic channel setting method of claim 8, wherein the transmitter operations further comprise:
  transmitting the tuned channel number and information indicating the non-existence of a digital signal to the receiver when no digital signals are detected through digital channel tuning, and tuning an analog channel;
  storing channel information about the tuned analog channel in a channel map and transmitting a signal indicating a completion of the channel information storage and information about addition or non-addition of the tuned channel number to the channel map to the receiver; and
  transmitting the next channel number to the receiver when receiving the message confirming the completion of the channel information storage from the receiver.

11. The automatic channel setting method of claim 8, wherein the receiver operations further comprise:
  receiving the tuned channel number and comparing the received tuned channel number with a stored channel number;
  extracting channel information from a received broadcasting stream when the received tuned channel number and the stored channel number match each other;
  storing the extracted channel information in a channel map when receiving the signal indicating the completion of the channel information storage from the transmitter; and transmitting the channel information storage confirmation message to the transmitter and then waiting for the next channel number.

12. The automatic channel setting apparatus of claim 5, wherein the reception module unit further demodulates a key code which is converted by the controller into a function control command.

13. The automatic channel setting apparatus of claim 6, wherein the stored channel number is the received initial channel number from the transmitter.

14. The automatic channel setting method of claim 11, wherein the stored channel number is the received initial channel number from the transmitter.

* * * * *